STUBER & FRANK.
Locomotive Lamp.
No. 32,155.
Patented April 23, 1861.
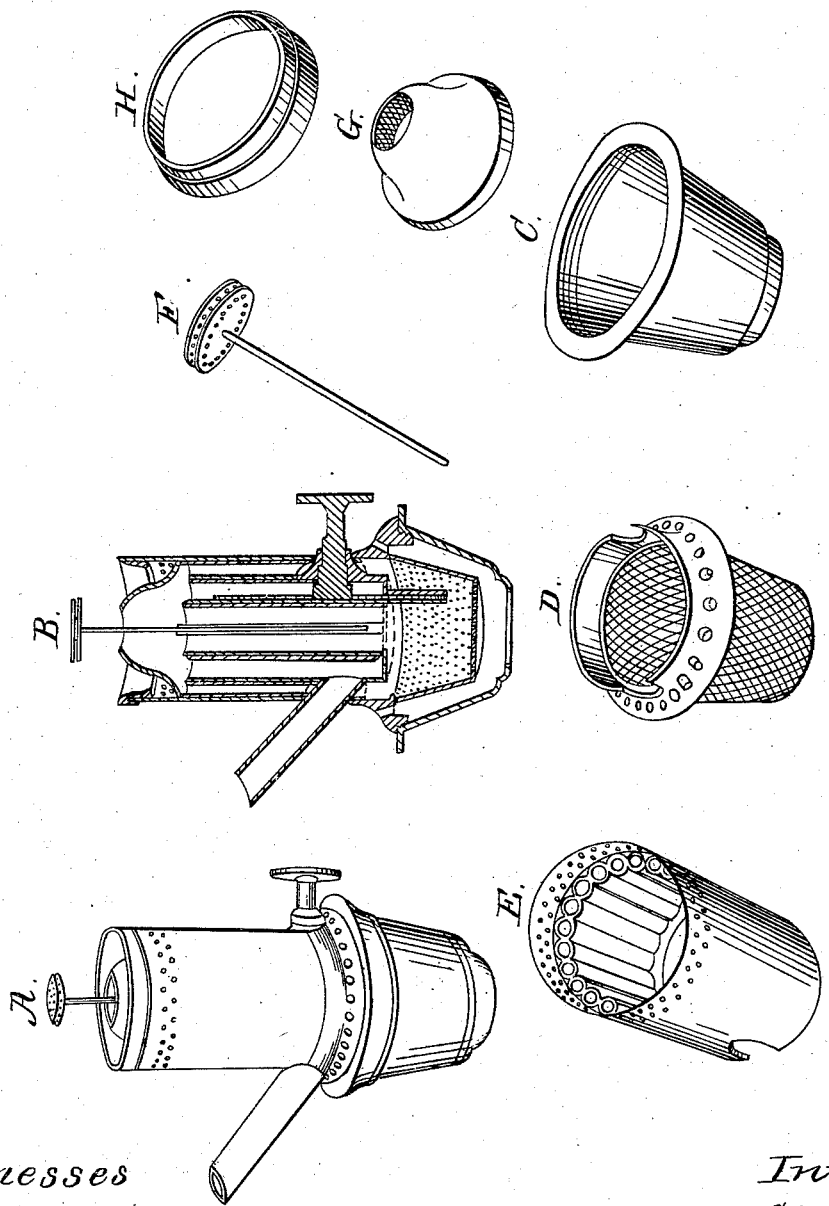
Witnesses
Inventors

UNITED STATES PATENT OFFICE.

JAKOB STUBER AND FRIEDRICH FRANK, OF UTICA, NEW YORK.

LAMP.

Specification forming part of Letters Patent No. 32,155, dated April 23, 1861; Reissued December 19, 1865, No. 2,128.

*To all whom it may concern:*

Be it known that we, JAKOB STUBER and FRIEDRICH FRANK, of the city of Utica, county of Oneida, and State of New York, have invented a new and Improved Burner for a Lamp for Burning Kerosene-Oil; and we do declare the following to be a full and exact description thereof, reference being had to the accompanying drawings and to the letters of reference marked thereon.

The apparatus for feeding the lamp, the wick tube, and the method of raising and lowering the wick, in our lamp, are the same as those in lamps of ordinary use.

At the bottom of our burner is affixed a reservoir or air chamber consisting of two parts, an outer and inner part, the outer part being air and water tight, and affixed to the inner part, by a thread cut in the collar to which the inner part is attached. The inner part sits into the outer part, leaving a small space between them, and is perforated full of small holes. The collar to which the inner part is attached is also perforated with a row of holes around its outward circumference, connecting with the space between the outer and inner parts of the air-chamber; around the body of the burner on its inside are arranged pipes or flues connecting with the air chamber and terminating at the top of the wick tube. The top of the body of the burner is also perforated with two rows of holes, the bottom row being even off with the top of the wick tube.

At the top of the wick tube is a double button or flange, perforated with a row of small holes around the outer edge of each, which button is affixed to a small rod, which fits into a socket, in the center of the wick tube, in such a manner as to allow the button to be raised or lowered at pleasure.

In the accompanying drawings Figure A, represents, in the perspective, our burner with all its parts combined. Fig. B represents a transverse section of the burner, showing its internal arrangements. Fig. C, is the outer part of the air chamber. Fig. D, is the inner part thereof, with the collar to which it is attached, and the holes around the same. Fig. E shows the body of the burner with the pipes or flues around its inner circumference connected therewith. Fig. F, represents the movable button perforated with holes to regulate the blaze. Fig. G, represents the top of the burner inclosing the blaze, and Fig. H a flange at the top of the burner.

The air enters the space between the outer and inner parts of the bottom of the burner, through the holes in the collar of Fig. D, and thence enters the air chamber, through the perforated parts of the inner part thereof also represented in Fig. D, and from thence escapes through the pipes or flues in the body of the burner to the top of the wick tube, as shown in Fig. E which with the holes at the top of the burner also shown in Fig. E, create sufficient draft to concentrate the blaze under the movable button, and thereby prevent the lamp from smoking.

Our burner is intended to be applied to locomotive lamps and will increase the brilliancy of the light and very much decrease the cost thereof.

What we claim as our invention and desire to secure by Letters Patent in circular wick lamps, is—

1. The arrangement of an air chamber below the wick tube formed by the perforated shell D, communicating with the outer air through openings formed in its collar for that purpose, when such chamber is used in connection with a series of tubes or flues, through which the air is conducted to the inside of the cone G, and by it directed in a steady current on the flame; thereby preventing flickering by the jarring of the lamp or from sudden currents of air striking the same.

2. In combination with the devices above mentioned, the arrangement of a series of holes in the body E of the lamp, immediately above the flange of the cone for the admission of air to the flame on the outside of the cone so as to furnish the requisite amount of oxygen to complete the combustion of the oil.

3. In connection with the devices above mentioned for the supply of oxygen to the flame, the perforated double button F, by means of which the gaseous products of the flame and the oxygen are thoroughly mixed and spread whereby a more perfect combustion is effected than by any other method now in use in circular wick lamps.

JAKOB STUBER.
FRIEDRICH FRANK.

Witnesses:
 DEXTER GILLMORE,
 C. V. SCHRUM.